United States Patent
Laurent et al.

(10) Patent No.: US 12,446,597 B2
(45) Date of Patent: Oct. 21, 2025

(54) METHOD FOR TREATING INSECTS, IN WHICH THE CUTICLES ARE SEPARATED FROM THE SOFT PART OF THE INSECTS USING A BELT SEPARATOR

(71) Applicant: YNSECT, Evry (FR)

(72) Inventors: Sophie Laurent, Paris (FR); Thibault Sarton Du Jonchay, Chevrières (FR); Jean-Gabriel Levon, Paris (FR); Ceclia Socolsky, Paris (FR); Lorena Sanchez, Juvisy (FR); Nathalie Berezina, Paris (FR); Benjamin Armenjon, Paris (FR); Antoine Hubert, Alfortville (FR)

(73) Assignee: YNSECT, Évry-Courcouronnes (FR)

( * ) Notice: Subject to any disclaimer, the term of this patent is extended or adjusted under 35 U.S.C. 154(b) by 1268 days.

(21) Appl. No.: 16/473,945

(22) PCT Filed: Mar. 10, 2017

(86) PCT No.: PCT/FR2017/050553
§ 371 (c)(1),
(2) Date: Jun. 26, 2019

(87) PCT Pub. No.: WO2018/122475
PCT Pub. Date: Jul. 5, 2018

(65) Prior Publication Data
US 2019/0335788 A1    Nov. 7, 2019

(30) Foreign Application Priority Data
Dec. 28, 2016 (FR) .................................. 1663477

(51) Int. Cl.
*A23K 10/20* (2016.01)
*A23J 1/02* (2006.01)
(Continued)

(52) U.S. Cl.
CPC .................. *A23K 10/20* (2016.05); *A23J 1/02* (2013.01); *A23J 3/04* (2013.01); *A23K 40/10* (2016.05)

(58) Field of Classification Search
CPC ............................... A23K 10/20; A23K 40/10
See application file for complete search history.

(56) References Cited

U.S. PATENT DOCUMENTS 5,241,901 A    9/1993   Kunig
2012/0285339 A1    11/2012   Rose et al.
(Continued)

FOREIGN PATENT DOCUMENTS

CA    2670245 A1    12/2010
CA    2970640 A1    7/2016
(Continued)

OTHER PUBLICATIONS

Translation of CN 102696740A (Year: 2012).*
(Continued)

*Primary Examiner* — Stephanie A Cox
(74) *Attorney, Agent, or Firm* — Panitch Schwarze Belisario & Nadel LLP; Erin M. Dunston

(57) ABSTRACT

The invention relates to a method for treating insects, comprising the separation of the cuticles from the soft part of the insects, wherein the separation is performed using a belt separator. The invention further relates to powders, in particular a powder obtainable by the method of treating insects according to the invention, and to the use of these powders in food.

7 Claims, 1 Drawing Sheet

(51) Int. Cl.
*A23J 3/04* (2006.01)
*A23K 40/10* (2016.01)

(56) References Cited

U.S. PATENT DOCUMENTS

| | | | | |
|---|---|---|---|---|
| 2015/0164109 A1* | 6/2015 | Ruben | ................... | A23K 10/20 426/2 |
| 2015/0374005 A1 | 12/2015 | Arsiwalla et al. | | |

FOREIGN PATENT DOCUMENTS

| | | | |
|---|---|---|---|
| CN | 101144097 | A | 3/2008 |
| CN | 102558387 | A | 7/2012 |
| CN | 102578390 | A | 7/2012 |
| CN | 102696740 | A † | 10/2012 |
| EP | 3078277 | A1 | 10/2016 |
| JP | 2014522240 | A | 9/2014 |
| RU | 2028793 | C1 | 2/1995 |
| WO | WO-97/39635 | A1 | 10/1997 |
| WO | 2014123420 | A1 | 8/2014 |
| WO | WO-2016/108037 | A1 | 7/2016 |

OTHER PUBLICATIONS

Yang et al. (Nutritional Composition and Protein Quality of the Edible Beetle, J INsent Sci. 2014; 14: 139; Jan. 1, 2014. Retrieved from the Internet: URL <https://www.ncbi.nlm.nih.gov/pmc/articles/PMC4684676/>). (Year: 2014).*

Biology of the honey bee. Textbook for technical schools. Zootechnics., M.: IN. "Agropromizdat" Chapter 4 Hemolymph (1991).

GEA Poster, *Process solutions from GEA to develop the Potential of Insects for the Food and Feed Industry*, Congress: Insecta 2016, 1 page (Sep. 12, 2016).

Verkerk et al., *Insect cells for human food*, 25 Biotechnology Advances 198-202 (2007).

International Search Report (PCT/ISA/210) mailed on Sep. 7, 2017, by the European Patent Office as the International Searching Authority for International Application No. PCT/FR2017/050553.

Written Opinion (PCT/ISA/237) mailed on Sep. 7, 2017, by the European Patent Office as the International Searching Authority for International Application No. PCT/FR2017/050553.

Newton, Larry, et al., "Using the Black Soldier Fly, *Hermetia illucens*, as a Value-Added Tool for the Management of Swine Manure", Jun. 2005, http://www.urbantilth.org/wp-content/uploads/2008/09/soldierfly-swine-manure-management.pdf.

Sanchez-Muros, et al., "Insect meal as renewable source of food for animal feeding: a review", Journal of Cleaner Production, vol. 65, Dec. 4, 2013, pp. 16-27, XP028607806.

Birgit A. Rumpold, Oliver K. Schl?ter; Potential and challenges of insects as an innovative source for food and feed production; Innovative Food Science & Emerging Technologies; vol. 17; 2013; pp. 1-11; ISSN 1466-8564; https://doi.org/10.1016/j.ifset.2012.11.005; (http://www.sciencedirect.com/science/article/pii/S1466856412001452).†

Juraj Majtn, Katarna Blikov, Oskar Markovi, Jn Grf, Grigorij Kogan, Jozef imth; Isolation and characterization of chitin from bumblebee (*Bombus terrestris*); International Journal of Biological Macromolecules; vol. 40, Issue 3; 2007; pp. 237-241; ISSN 0141-8130; https://doi.org/10.1016/j.ijbiomac.2006.07.010; (http://www.sciencedirect.com/science/article/pii/S0141813006002352).†

A.T. Dossey, J.T. Tatum, W.L. McGill; Chapter 5—Modern Insect-Based Food Industry: Current Status, Insect Processing Technology, and Recommendations Moving Forward; Editor(s): Aaron T. Dossey, Juan A. Morales-Ramos, M. Guadalupe Rojas; Insects as Sustainable Food Ingredients; Academic Press; 2016; pp. 113-152; ISBN 9780128028568; https://doi.org/10.1016/B978-0-12-802856-8.00005-3; (http://www.sciencedirect.com/science/article/pii/B9780128028568000053).†

* cited by examiner
† cited by third party

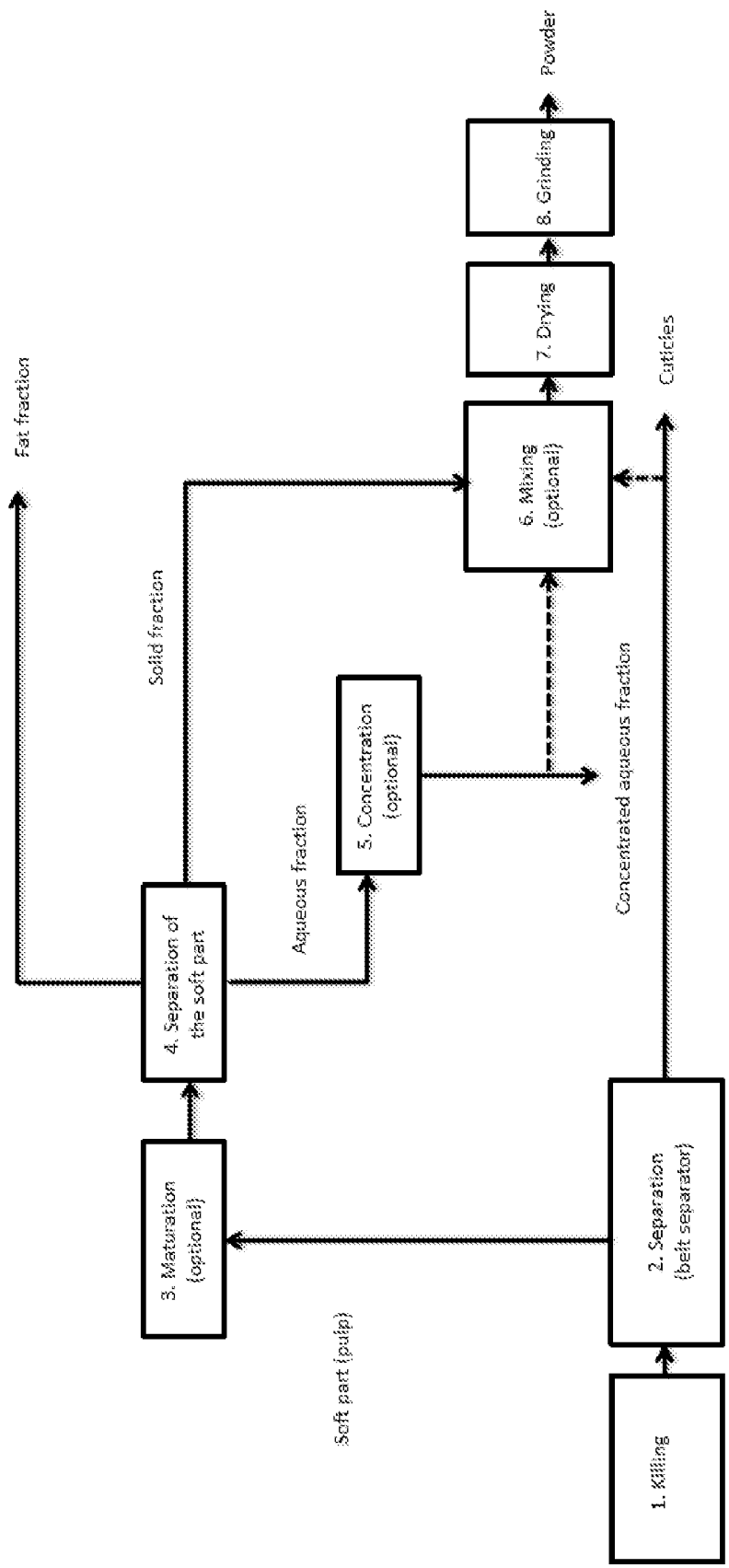

METHOD FOR TREATING INSECTS, IN WHICH THE CUTICLES ARE SEPARATED FROM THE SOFT PART OF THE INSECTS USING A BELT SEPARATOR

The present invention relates to a process (or method) for treating insects. The invention also relates to powders, in particular a powder obtainable by the process for treating insects according to the invention, and the use of these powders in nutrition, in particular in animal nutrition.

Powders prepared from animals have long been used in animal nutrition.

One of the most commonly used powders is fishmeal, which represents one of the main protein sources in animal nutrition. Fishmeal is very rich in animal proteins (rich in lysine- and methionine-type amino acids) that are easily digestible. A growing demand accompanied by a limited supply has resulted, in particular, in a significant increase in its price. Thus, there is a high demand for alternative sources of high-quality and, so far as possible, renewable proteins that would be able to be used in animal nutrition.

Over these last few years, the use of meals prepared from insects has been proposed as a substitute for fishmeal.

Insect meals offer natural replacement protein sources and the possibility of being mass-produced with a minimal ecological footprint. In particular, certain beetles such as *Tenebrio molitor*, have the benefit of being suitable for intensive mass production.

By way of example, application WO2016/108037 describes in particular a beetle powder comprising at least 67% by weight proteins and at least 5% by weight chitin, able to be used in animal nutrition.

In the context of the present application, by "chitin" is meant any type of chitin derivative, i.e. any type of polysaccharide derivative comprising N-acetyl-glucosamine units and D-glucosamine units, in particular the chitin-polypeptide copolymers (sometimes referred to as "chitin-polypeptide composite"). These copolymers can also be combined with pigments, often of the melanin type.

Chitin is thought to be the second most-synthesized polymer in the living world, after cellulose. In fact, chitin is synthesized by numerous species in the living world: it partly constitutes the exoskeleton of crustaceans and insects, and the lateral wall which surrounds and protects fungi. More particularly, in insects, chitin thus constitutes 3 to 60% of their exoskeleton.

However, chitin is generally considered a compound that is difficult for certain animals to digest.

There is thus a need for powders prepared from insects which would have a reduced chitin content.

The work of the inventors has made it possible to highlight that it was possible to obtain such powders, when the insects from which these powders are prepared undergo a specific treatment.

The work of the inventors has made it possible to highlight that it was possible to obtain such powders, when the insects from which these powders are prepared undergo a specific treatment.

The invention thus relates to a process for treating insects comprising separation of the cuticles from the soft part of the insects, in which the separation is carried out using a belt separator.

By "insects" is meant insects at any stage of development, such as an adult, larval or nymph stage.

The cuticle is the outer layer (or exoskeleton) secreted by the epidermis of the insects. It is generally formed of three layers: the epicuticle, the exocuticle and the endocuticle.

By "soft part" is meant the flesh (comprising in particular the muscles and the viscera) and the juice (comprising in particular the body fluids, water and haemolymph) of the insects. In particular, the soft part does not consist of the juice of the insects.

Advantageously, the insects utilized in the process according to the invention are at a larval stage.

Preferably, the insects utilized in the process according to the invention are edible.

Advantageously, the insects preferred for the implementation of the process according to the invention are for example the Coleoptera, Diptera, Lepidoptera, Isoptera, Orthoptera, Hymenoptera, Blattoptera, Hemiptera, Heteroptera, Ephemeroptera and Mecoptera, preferably, Coleoptera, Diptera, Orthoptera, Lepidoptera or mixtures thereof, even more preferentially Coleoptera.

The beetles preferentially utilized in the process according to the invention belong to the families of the Tenebrionidae, Melolonthidae, Dermestidae, Coccinellidae, Cerambycidae, Carabidae, Buprestidae, Cetoniidae, Dryophthoridae, or mixtures thereof.

More preferentially, they are the following beetles: *Tenebrio molitor, Aiphitobius diaperinus, Zophobas morio, Tenebrio obscurus, Tribolium castaneum* and *Rhynchophorus ferrugineus*, or mixtures thereof.

By "belt separator" is meant a device making it possible to separate the solid part from the soft part of a product, and which comprises a squeezing belt (or belt press filter) and a perforated drum.

Separation of the cuticles from the soft part of the insects is described in more detail in step 2 hereinafter of the detailed process for treating insects according to the invention.

This separation of the cuticles from the soft part of the insect makes it possible in particular to separate the chitin from the soft part. In fact, the cuticles obtained at the end of this separation step have a high chitin content of the order of 10 to 30% by weight with respect to the total weight of cuticles, as indicated hereinafter.

In particular, the step of separating the cuticles from the soft part is carried out without any prior step of grinding the insects, in particular in the form of particles, having been carried out.

The process for treating insects according to the invention can also comprise a step of maturation of the soft part of the insects.

By "step of maturation of the soft part of the insects" is meant more particularly a step during which the soft part of the insects is subjected to stirring.

This step is described in more detail in step 3 hereinafter of the detailed process for treating insects according to the invention.

Preferably, the process for treating insects according to the invention comprises a step of separating the soft part of the insects into a fat fraction, a solid fraction and an aqueous fraction.

The fat fraction has a lipid content greater than or equal to 90%, preferentially greater than or equal to 95%, even more preferentially greater than or equal to 99% by weight with respect to the total weight of the fat fraction.

It will be noted that, in the context of the present application, and unless otherwise stipulated, the ranges of values indicated are understood to be inclusive.

The solid fraction has a dry matter content comprised between 45 and 65% by weight with respect to the total weight of the solid fraction.

The aqueous fraction has a carbohydrate content comprised between 15 and 40% by weight, preferably between 20 and 30% by weight with respect to the total dry weight of the aqueous fraction.

At the end of the step of separating the soft part, and before an optional concentration thereof, the aqueous fraction has a dry matter content less than or equal to 20% by weight, preferably less than or equal to 15% by weight with respect to the total weight of the aqueous fraction.

Similarly, separating the soft part of the insects into a fat fraction, a solid fraction and an aqueous fraction is described in more detail in step 4 hereinafter of the detailed process for treating insects according to the invention.

The process for treating insects according to the invention can comprise a killing step prior to the step of separating the cuticles from the soft part.

Advantageously, following the killing step 1, the insects are directly used for implementing the step 2 of separating the cuticles from the soft part of the insects, i.e. the insects are not subject to any treatment, such as grinding, freezing or dehydration between step 1 and step 2.

This killing step is described in more detail in step 1 hereinafter of the detailed process for treating insects according to the invention.

Optionally, the process for treating insects according to the invention comprises, at the end of the separation of the soft part into a fat fraction, a solid fraction and an aqueous fraction, a step of concentrating the aqueous fraction in order to obtain a concentrated aqueous fraction.

This step is described in more detail in step 5 hereinafter of the detailed process for treating insects according to the invention.

Optionally, the process for treating insects according to the invention also comprises a step of mixing the solid fraction:
with all or part of the concentrated aqueous fraction; and/or
all or part of the cuticles,
in order to obtain a mixture.

This step is described in more detail in step 6 hereinafter of the detailed process for treating insects according to the invention.

Preferably, the process for treating insects according to the invention comprises a step of drying the solid fraction or the mixture in order to obtain a dry solid fraction or a dry mixture.

This step is described in more detail in step 7 hereinafter of the detailed process for treating insects according to the invention.

Preferentially, the process for treating insects according to the invention also comprises a step of grinding the dry solid fraction or the dry mixture.

This step is described in more detail in step 8 hereinafter of the detailed process for treating insects according to the invention.

According to a preferred embodiment of the process for treating insects according to the invention, the latter is a process for preparing a powder, and in particular an insect powder, and comprises the following steps:
i) killing the insects;
ii) separating the cuticles from the soft part of the insects;
iii) optionally, maturation of the soft part of the insects;
iv) separating the soft part of the insects into a solid fraction, an aqueous fraction and a fat fraction;
v) optionally, concentrating the aqueous fraction in order to obtain a concentrated aqueous fraction;
vi) optionally, mixing the concentrated aqueous fraction and/or the cuticles with the solid fraction in order to obtain a mixture;
vii) drying the solid fraction obtained in step iv) or the mixture obtained in step vi) in order to obtain a dry solid fraction or a dry mixture; and
viii) grinding the dry solid fraction or the dry mixture obtained in step vii).

DETAILED PROCESS FOR TREATING INSECTS ACCORDING TO THE INVENTION

Step 1: Killing the Insects

This killing step 1 can advantageously be carried out by thermal shock, such as by scalding or by blanching. This step 1 makes it possible to kill the insects while reducing the microbial load (reducing the risk of deterioration and health risk) and inactivating the internal enzymes of the insects able to trigger autolysis, and thus rapid browning thereof.

For the scalding, the insects, preferably larvae, are thus scalded with water for 2 to 20 min, preferentially 5 to 15 min. Preferably, the water is at a temperature comprised between 87 to 100° C., preferentially 92 to 95° C.

The quantity of water introduced during the scalding is determined as follows: the ratio of the volume of water in ml to the weight in g of insects is preferably comprised between 0.3 and 10, more preferentially between 0.5 and 5, even more preferentially between 0.7 and 3, even more preferentially of the order of 1.

For the blanching, the insects, preferably larvae, are blanched with water or with steam (steam nozzles or bed) at a temperature comprised between 80 and 105° C., preferably between 87 and 105° C., more preferentially between 95 and 100° C., even more preferentially 98° C. or with water at a temperature comprised between 90 and 100° C., preferentially between 92 and 95° C. (by spray nozzles) or in mixed mode (water+steam) at a temperature comprised between 80 and 130° C., preferably between 90 and 120° C., more preferentially between 95 and 105° C., even more preferentially 98° C. When the insects are blanched with steam only, the blanching is advantageously carried out in forced steaming blanching machines. The residence time in the blanching chamber is comprised between 5 seconds and 15 minutes, preferentially between 1 and 7 min.

Advantageously, following the killing step 1, the insects are directly used for implementing the step 2 of separating the cuticles from the soft part of the insects, i.e. the insects are not subject to any treatment, such as grinding, freezing or dehydration between step 1 and step 2.

Step 2: Separating the Cuticles from the Soft Part of the Insects

This step is carried out using a belt separator and the object is to separate the cuticles from the soft part of the insects.

By way of example, a belt separator can comprise a squeezing belt and a perforated drum, the squeezing belt surrounding at least a part of the perforated drum.

The squeezing belt allows the insects to be conveyed to and applied against the perforated drum so as to cause the soft part of the insects to pass, by pressure, through the perforations of the drum, while the cuticles remain outside the drum.

The cuticles can then be recovered using a scraper blade.

By way of example there may be mentioned belt separators from Baader, such as belt separators 601 to 607 ("soft separator 601 to 607") or also the SEPAmatic® belt separators from BFD Corporation (410 to 4000 V range).

Advantageously, the diameter of the perforations of the drum is comprised between 0.5 and 3 mm, preferably between 1 and 2 mm.

As regards the pressure, a person skilled in the art is capable of determining the pressure to be exerted, allowing the separation of the cuticles from the soft part of the insects.

This step of separation of the insects is different from conventional pressing that can be carried out for example with a single-screw or twin-screw press in that it allows a (clean) separation of the soft part and the cuticles of the insects and not a separation of a juice from a solid fraction.

The cuticles obtained in step 2 comprise between 10 and 30%, preferably between 15 and 25% by weight chitin, with respect to the total dry weight of cuticles.

The chitin content is determined by extraction thereof.

The chitin content is determined by extraction thereof. By way of example, a method for determining the chitin content that can be used is the AOAC 991.43 method.

Moreover, the cuticles comprise less than 25%, preferably less than 10%, more preferentially less than 5%, even more preferentially less than 3% by weight lipids with respect to the total dry weight of the cuticles.

The methods for determining the fat content (lipids) are well known to a person skilled in the art. By way of example and in a preferred manner, this content will be determined according to the method of EC Regulation 152/2009.

Throughout the entire application, when no date is specified for a regulation, a standard or a directive, it is the regulation, standard or directive in force on the date of filing.

In addition, the cuticles comprise between 55 and 90%, advantageously between 60 and 85%, preferably between 65 and 80% by weight proteins with respect to the total dry weight of cuticles.

In the context of the present application, by "proteins" is meant the quantity of crude proteins. The quantification of crude proteins is well known to a person skilled in the art. By way of example, the Dumas method or the Kjeldahl method may be mentioned. Preferably, the Kjeldahl method is used.

It will be noted however that this method is based on measuring the nitrogen content. Now, chitin contains nitrogen at a content of the order of 8%. As a result, the nitrogen content of the chitin was deduced from the nitrogen content measured before carrying out the conversion making it possible to obtain the protein content.

The cuticles comprise between 0.5 and 30%, advantageously between 1 and 20%, preferably between 5 and 15% by weight carbohydrates with respect to the total dry weight of cuticles.

The carbohydrate content was calculated by measuring the carbohydrate difference. According to this method, the carbohydrate content is equal to the dry matter content from which is subtracted the ash, protein and lipid contents.

In addition, the cuticles preferably comprise at least 0.08% by weight, more preferentially at least 0.1% by weight, even more preferentially at least 0.12% by weight trehalose with respect to the total dry weight of cuticles.

The quantity of trehalose is determined by GC-MS analysis. Such analysis is described in more detail in Example 1 hereinafter.

The soft part obtained in step 2 comprises between 20 and 50% by weight lipids, preferably between 30 and 40% by weight lipids with respect to the total dry weight of the soft part.

In addition, the soft part comprises at least 45%, preferably at least 48%, more preferentially at least 50% by weight proteins with respect to the total dry weight of the soft part.

Step 3: Maturation of the Soft Part of the Insects

The soft part of the insects is then, optionally, subjected to stirring in a tank.

Advantageously, the maturation is carried out for a duration comprised between 15 minutes and 3 hours, preferably for 1 h.

Advantageously, the maturation is carried out at a temperature comprised between 65 and 100° C., preferably between 85 and 100° C., more preferentially at a temperature of approximately 90° C.

This step makes it possible to facilitate the separation of the soft part of the insects in step 4 hereinafter.

Preferably, the process according to the invention comprises such a step.

In particular, no dilution of the soft part of the insects in a solvent such as water is necessary in this step.

Step 4: Separating the Soft Part into a Solid Fraction, an Aqueous Fraction and a Fat Fraction The object of this step is to recover three fractions from the soft part of the insects obtained in step 2 or 3, namely a solid fraction, an aqueous fraction and a fat fraction.

According to a first embodiment, this step of separating the soft part is carried out in two sub-steps.

In the first sub-step, the soft part of the insects is subjected to decanting using a 2-phase decanter so as to obtain a solid fraction and a liquid fraction.

In the second sub-step, the liquid fraction is subjected to centrifuging so as to recover a fat fraction and an aqueous fraction.

Advantageously, in this second sub-step, a disc stack centrifuge is used.

According to a second embodiment of step 4, the soft part of the insects is subjected to decanting using a 3-phase decanter so as to directly obtain an aqueous fraction, a fat fraction and a solid fraction.

Suitable 3-phase decanters are, for example, the Tricanter® from Flottweg, or 3-phase decanters from GEA, such as the CA 225-03-33 decanter.

Advantageously, separation of the soft part is carried out according to the second embodiment.

In fact, the use of a 3-phase decanter makes it possible to obtain a particularly effective separation of the phases. More particularly, the solid fraction obtained has a high dry matter content, the aqueous fraction comprises few insoluble sediments (originating from the solid fraction) and oil, and the fat fraction comprises few insoluble sediments (originating from the solid fraction) and water.

Step 5: Concentrating the Aqueous Fraction

The aqueous fraction obtained in step 4 is then optionally concentrated, in order to obtain a concentrated aqueous fraction.

Advantageously, concentration is carried out by evaporation.

Advantageously, evaporation is carried out at a temperature comprised between 30 and 100° C., preferably between 60 and 80° C.

Preferably, evaporation is carried out at a pressure comprised between 50 and 1013 mbars, preferably at 1013 mbars.

Evaporation is preferably carried out for a duration comprised between 5 and 20 minutes.

Concentration is preferably carried out using a falling film evaporator, a rising film plate evaporator, or a thin film evaporator.

This type of standard equipment can be used without encountering problems of fouling, in particular owing to the small quantity of sediments present in the aqueous fraction.

In general, the aqueous fractions cannot be concentrated beyond 42% dry matter, as they tend to gel (stickwater) above this concentration.

In the case of the present invention, the aqueous fraction comprises soluble proteins of small size (at least 45% of the soluble proteins of the aqueous fraction have a size less than 550 g/mol, as described in more detail hereinafter), which makes it possible to avoid gelling and thus to obtain an aqueous fraction with a high concentration of dry matter (up to 70%) and having a viscosity less than 30000 cPs (centipoises).

By "soluble proteins" is meant, among the crude proteins, those which are soluble in an aqueous solution the pH of which is comprised between 6 and 8, advantageously between 7.2 and 7.6.

When the term "proteins" alone is used in the present application, it denotes crude proteins.

Preferably, the aqueous solution is a buffer solution the pH of which is comprised between 6 and 8, advantageously between 7.2 and 7.6. Preferentially, the buffer solution is an NaCl phosphate buffer solution, the pH of which is equal to 7.4+/−0.2.

In addition, the step of concentrating the aqueous fraction is doubly beneficial, since it makes it possible to:
- save steam: in the absence of the concentrating step 5, the water would have to be evaporated during the drying step 7 described hereinafter, with a dryer the specific steam consumption of which is greater than that of a concentrator as described above; and
- avoid microbiological contamination, by virtue of a reduction in the volume and the osmotic pressure due to the high concentration of dry matter of the concentrated aqueous fraction.

Step 6: Mixing the Concentrated Aqueous Fraction and/or the Cuticles with the Solid Fraction All or part of the cuticles obtained in step 2 and/or all or part of the concentrated aqueous fraction obtained in step 5 can optionally be mixed partially or wholly with the solid fraction obtained in step 4 in order to obtain a mixture.

Advantageously, the mixture is homogenized in order to facilitate the subsequent treatment thereof.

The mixers that can be used are for example conical screw mixers such as those from Vrieco-Nauta®, or pendulum agitators such as those from PMS.

It will be noted that on average, for a kilogram of solid fraction obtained, 500 to 650 g of cuticles is obtained, for example approximately 550 g, and 250 to 350 g of aqueous fraction, for example approximately 300 g.

Step 7: Drying the Solid Fraction Obtained in Step 4 or the Mixture Obtained in Step 6

The solid fraction obtained in step 4 or the mixture obtained in step 6 can be dried in order to obtain a dry solid fraction or a dry mixture.

Advantageously, drying is carried out using a disc dryer, a tubular dryer, a propeller dryer, a dryer of the flash type, a thin layer dryer or a spray dryer.

Preferably, drying is carried out using a disc dryer or a tubular dryer.

Suitable tubular dryers are for example those from Tummers (Simon Dryers Technology).

Suitable disc dryers are for example those from Haarslev.

Drying can be carried out for between 1 and 10 hours, preferably between 3 and 5 hours.

Advantageously, drying is carried out at a temperature comprised between 60 and 225° C., preferably between 80 and 100° C.

Preferably, evaporation is carried out at atmospheric pressure.

Step 8: Grinding the Dry Solid Fraction or the Dry Mixture Obtained in Step 7

Following drying, grinding can be carried out and a powder is obtained.

By "powder" is meant a composition in the form of particles.

Preferably, the powder according to the invention is an insect powder, i.e. a powder prepared only from insects and optionally water.

A grinder such as a hammer mill or a cone mill (such as the Kek cone mills from Kemutec) can for example be used.

Advantageously, at the end of this grinding, the size of the particles is less than 0.5 cm (largest particle size observable using a microscope), preferably of the order of 1 mm. More particularly, the particle size is comprised between 300 µm and 1 mm, even more preferentially between 500 and 800 µm.

When the powder is ground to a particle size acceptable for human or animal nutrition, it can be referred to as "meal" and in particular "insect meal". By "particle size acceptable for human or animal nutrition" is meant a particle size comprised between 100 µm and 1.5 mm, preferentially comprised between 300 µm and 1 mm, more preferably between 500 and 800 µm.

According to whether optional steps 5 and/or 6 is/are implemented or not, different powders can be obtained, namely:
- a powder resulting only from the solid fraction (step 6 not implemented);
- a powder resulting from mixing the solid fraction and all or part of the cuticles;
- a powder resulting from mixing the solid fraction and all or part of the concentrated aqueous fraction;
- a powder resulting from mixing the solid fraction, all or part of the cuticles and all or part of the concentrated aqueous fraction.

The invention also relates to the products originating from the process according to the invention.

The invention also relates to a solid fraction obtainable by the process for treating insects according to the invention.

The invention also relates to a solid fraction comprising at least 71% by weight proteins and between 0.1 and 2% by weight chitin, the percentages by weight being indicated with respect to the total dry weight of the solid fraction.

Preferably, the solid fraction comprises at least 73% by weight, more preferentially at least 74% by weight, even more preferentially at least 75% by weight proteins, the percentages by weight being indicated with respect to the total dry weight of the solid fraction.

Advantageously, the solid fraction comprises between 0.5 and 1.7% by weight chitin with respect to the total dry weight of the solid fraction.

Advantageously, the solid fraction comprises between 5 and 17% by weight lipids, preferably between 10 and 15% by weight lipids with respect to the total dry weight of the solid fraction.

Preferably, the solid fraction comprises between 1 and 10% by weight, preferably between 2 and 6% by weight ash with respect to the total dry weight of the solid fraction.

The method for determining the ash content is well known to a person skilled in the art. Preferably, the ash content was determined according to the method laid down by EC Regulation 152/2009 of 27 Jan. 2009.

In addition, the solid fraction comprises preferably between 5 and 15% by weight, more preferentially between 7 and 13% by weight carbohydrates with respect to the total dry weight of the solid fraction.

More particularly, the solid fraction comprises preferably at least 0.2% by weight, more preferentially at least 0.3% by weight, even more preferentially at least 0.35% by weight trehalose with respect to the total dry weight of the solid fraction.

Moreover, the digestibility of proteins in humans and animals is significantly conditioned by the size of the proteins. In animal nutrition, it is common to reduce the size of the proteins in order to facilitate digestion by animals. This reduction in the size of the proteins is generally carried out by hydrolysis processes (for example enzymatic), the implementation of which is particularly costly.

The solid fraction comprises soluble proteins the size of which is sufficiently reduced in order to facilitate digestion by animals.

Advantageously, at least 75%, preferentially at least 80%, more preferentially at least 85% of the soluble proteins of the solid fraction have a size less than or equal to 12400 g/mol.

More particularly, at least 55%, preferably at least 60%, more preferentially at least 65% of the soluble proteins of the solid fraction have a size less than 550 g/mol.

The invention also relates to an aqueous fraction obtainable by the process for treating insects according to the invention.

The invention also relates to an aqueous fraction comprising at least 48% by weight proteins, at least 2% by weight trehalose and having a lipid content less than 7% by weight, the percentages by weight being indicated with respect to the total dry weight of the aqueous fraction.

Preferably, the aqueous fraction comprises at least 55% by weight, more preferentially at least 60% by weight, even more preferentially at least 65% by weight proteins with respect to the total dry weight of the aqueous fraction.

Advantageously, the aqueous fraction comprises at least 2.5% by weight, more preferentially at least 3% by weight trehalose with respect to the total dry weight of the aqueous fraction.

Preferably, the aqueous fraction has a lipid content less than 6% by weight, more preferentially less than 4% by weight, even more preferentially less than 2% by weight with respect to the total dry weight of the aqueous fraction.

Advantageously, the aqueous fraction comprises between 5% and 20% by weight ash, preferably between 7% and 15% by weight ash with respect to the total dry weight of the aqueous fraction.

In addition, the aqueous fraction comprises less than 2% by weight insoluble sediments, preferably less than 1% by weight insoluble sediments with respect to the total weight of the aqueous fraction.

The aqueous fraction does not comprise chitin.

In a similar manner to the solid fraction, the aqueous fraction comprises soluble proteins the size of which is sufficiently reduced in order to facilitate digestion by animals.

Advantageously, at least 90%, preferentially at least 95%, more preferentially at least 97% of the soluble proteins of the aqueous fraction have a size less than or equal to 12400 g/mol.

More particularly, at least 45%, preferably at least 50%, more preferentially at least 53% of the soluble proteins of the aqueous fraction have a size less than 550 g/mol.

More particularly, the aqueous fraction has a dry matter content comprised between 5 and 15% by weight with respect to the total weight of the aqueous fraction.

When concentrated, the concentrated aqueous fraction has a dry matter content comprised between 55 and 75% by weight with respect to the total weight of the concentrated aqueous fraction.

The invention also relates to a concentrated aqueous fraction obtainable by the process for treating insects according to the invention, said treatment process then comprising the optional concentration step.

The invention also relates to a fat fraction obtainable by the process for treating insects according to the invention.

The invention also relates to a powder obtainable by the process for treating insects comprising the following steps:
  separating the cuticles from the soft part of the insects,
  separating the soft part of the insects into a fat fraction, a solid fraction and an aqueous fraction,
  optionally, concentrating the aqueous fraction,
  optionally, mixing the solid fraction with:
    all or part of the concentrated aqueous fraction; and/or
    all or part of the cuticles,
  in order to obtain a mixture,
  drying the solid fraction or the mixture in order to obtain a dry solid fraction or a dry mixture, respectively;
  grinding the dry solid fraction or the dry mixture.

This process for treating insects can also comprise one or more of the characteristics described above.

The invention relates more particularly to a powder obtainable by the process for preparing a powder, and in particular an insect powder, according to the invention, as described above.

As indicated above, according to whether optional steps 5 and/or 6 of the process for treating insects according to the invention, namely the step of concentrating the aqueous fraction and the step of mixing all or part of the cuticles and/or all or part of the concentrated aqueous fraction, with the solid fraction, is/are implemented or not, and where necessary according to the conditions of their implementation, different powders can be obtained.

The invention also relates to a powder, and in particular an insect powder, comprising at least 71% by weight proteins and between 0.1 and 4% by weight chitin, the percentages by weight being indicated with respect to the total dry weight of powder.

Preferably, this powder has a protein content greater than or equal to 72% by weight, more preferentially greater than or equal to 74% by weight, even more preferentially greater than or equal to 75% by weight with respect to the total dry weight of powder.

More particularly, this powder has a chitin content comprised between 0.5 and 3% by weight, more preferentially comprised between 0.8 and 2% by weight, even more preferentially comprised between 0.8 and 1.7% by weight with respect to the total dry weight of powder.

Preferably, this powder comprises between 5 and 20% by weight, preferably between 7 and 17% by weight lipids with respect to the total dry weight of powder.

More particularly, this powder comprises between 1 and 10% by weight, preferably between 2 and 6% by weight ash with respect to the total dry weight of powder.

In addition, this powder preferably comprises between 3 and 20% by weight carbohydrates with respect to the total dry weight of powder.

More particularly, this powder preferably comprises at least 0.1% by weight, more preferentially at least 0.2% by weight trehalose with respect to the total dry weight of powder.

When optional steps 5 and/or 6 is/are not implemented, a powder, and in particular an insect powder, is obtained resulting only from the solid fraction.

This powder comprises at least 71% by weight proteins and between 0.1 and 2% by weight chitin, the percentages by weight being indicated with respect to the total dry weight of powder.

Preferably, this powder has a protein content greater than or equal to 72% by weight, more preferentially greater than or equal to 74% by weight, even more preferentially greater than or equal to 75% by weight with respect to the total dry weight of powder.

More particularly, this powder has a chitin content comprised between 0.5 and 1.7% by weight chitin with respect to the total dry weight of powder.

Preferably, this powder comprises between 5 and 17% by weight, preferably between 10 and 15% by weight lipids with respect to the total dry weight of powder.

More particularly, this powder comprises between 1 and 10% by weight, preferably between 2 and 6% by weight ash with respect to the total dry weight of powder.

In addition, this powder preferably comprises between 5 and 15% by weight, more preferentially between 7 and 13% by weight carbohydrates with respect to the total dry weight of powder.

More particularly, this powder preferably comprises at least 0.2% by weight, more preferentially at least 0.3% by weight, even more preferentially at least 0.35% by weight trehalose with respect to the total dry weight of powder.

When steps 5 and 6 of the process according to the invention are implemented, a powder resulting from mixing the solid fraction, all or part of the cuticles and all or part of the concentrated aqueous fraction can also be obtained.

The invention thus also relates to a powder, and in particular an insect powder, comprising at least 65% by weight proteins, at least 10% by weight carbohydrates and between 0.1 and 2% by weight chitin, the percentages by weight being indicated with respect to the total dry weight of powder.

Preferably, this powder has a protein content greater than or equal to 70% by weight, more preferentially greater than or equal to 74% by weight with respect to the total dry weight of powder.

More particularly, this powder has a chitin content comprised between 0.2 and 1.5% by weight, more preferentially between 0.5 and 1.3% by weight with respect to the total dry weight of powder.

Preferably, this powder has a carbohydrate content greater than or equal to 12% by weight, more preferentially greater than or equal to 14% by weight with respect to the total dry weight of powder.

More particularly, this powder preferably comprises at least 0.7% by weight, more preferentially at least 0.9% by weight, even more preferentially at least 1% by weight and even more preferentially at least 1.2% by weight trehalose with respect to the total dry weight of powder.

Preferably, this powder comprises between 5 and 15% by weight, preferably between 7 and 13% by weight lipids with respect to the total dry weight of powder.

More particularly, this powder comprises between 3 and 10% by weight, preferably between 4 and 8% by weight ash with respect to the total dry weight of powder.

The residual moisture level of the powders according to the invention is comprised between 2 and 15%, preferably between 5 and 10%, more preferentially between 4 and 8%. This moisture level can for example be determined according to the method originating from EC Regulation 152/2009 of 27 Jan. 2009 (103° C./4 h).

Advantageously, the proteins of the powders according to the invention have a digestibility greater than or equal to 85% by weight with respect to the total weight of crude proteins.

The digestibility is a pepsin digestibility measured by the method described in Directive 72/199/EC.

Preferably, the digestibility is greater than or equal to 88%, more preferentially greater than or equal to 92%.

The invention also relates to the use as flavouring of an aqueous fraction according to the invention, a concentrated aqueous fraction according to the invention, or the powder comprising at least 65% proteins, at least 10% by weight carbohydrates and between 0.1 and 2% by weight chitin according to the invention described above, advantageously in animal nutrition.

Finally, the invention relates to the use of a powder according to the invention in nutrition, preferably in animal nutrition.

Other characteristics and advantages of the invention will become apparent from the following examples, given by way of illustration, with reference to:

FIG. 1, which is a diagram illustrating the detailed process for treating insects according to the invention.

EXAMPLE 1: PROCESS FOR TREATING INSECTS ACCORDING TO THE INVENTION

The larvae of *Tenebrio molitor* were used. Upon receipt of the larvae, they can be stored at 4° C. for 0 to 15 days in their rearing tanks without major degradation before being killed. The weight of the larvae (age) used is variable and as a result their composition can vary, as illustrated in Table 1 below:

TABLE 1

| Biochemical composition of the larvae of *Tenebrio molitor* according to the weight thereof. | | | | | | | |
|---|---|---|---|---|---|---|---|
| Biomass (insects) | mg | 23 | 35 | 58 | 80 | 108 | 154 |
| Dry matter | %* | 34 | 34 | 34.2 | 37.9 | 39.6 | 39.5 |
| Ash | %* | 1.59 | 1.52 | 1.6 | 1.75 | 1.67 | 1.43 |
| Crude proteins | %* | 22.6 | 22.2 | 22 | 23.2 | 23.1 | 23.2 |
| Lipids | %* | 6.62 | 6.88 | 7.98 | 10.3 | 10.9 | 11.7 |

*The % s are expressed in dry weight with respect to the wet weight of larvae.

Step 1: Killing the Insects

Living larvae (+4° C. to +25° C.) are conveyed in layers with a thickness comprised between 2 and 10 cm, on a perforated conveyor belt (1 mm) to a blanching chamber. The insects are thus blanched with steam (steam nozzles or bed) at 98° C. under forced ventilation or with water at 92-95° C. (spray nozzles) or in mixed mode (water+steam). The residence time in the blanching chamber is comprised between 5 seconds and 15 minutes, ideally 5 min.

The temperature of the larvae after blanching is comprised between 75° C. and 98° C.

Step 2: Separating the Soft Part from the Cuticles of the Insects

The larvae, once blanched, are conveyed to the feed hopper of a belt separator, in order to separate the cuticles from the soft part of the larvae.

Advantageously, the separation is performed immediately after killing so that the larvae do not have time to cool to ambient temperature.

The belt separator used is a belt separator 601 from Baader.

The diameter of the perforations of the drum is 1.3 mm.

The soft part of the insects is recovered in a tank.

The cuticles are recovered using a scraper blade.

Determining the Quantity of Trehalose of the Cuticles

The quantity of trehalose in the cuticles recovered in step 2 was measured in the following manner:

The trehalose is analyzed by GC-MS.

Temperature programme: 150° C., followed by an increase of 10° C./min up to 260° C., after 5 minutes at this temperature, an increase of 25° C./min up to 310° C. and maintaining this temperature for 2 minutes. Temperature of the injector: 280° C., of the interface: 250° C., the split ratio is 10, the injection volume is 1 μL. For example, an sH-RXI-5 mS column, 30 m×0.25 mm×0.25 μm is used.

Preparation of the sample for analysis is carried out in the following manner: a precise quantity of the sample (between 10 and 300 mg) is weighed in a Falcon tube, 9.75 mL of methanol is added thereto as well as 250 μL of an internal standard solution (myo-inositol, 25 μg/mL) in DMSO. The mixture is stirred at 80° C. for 10 minutes, 100 μL of BSTFA is then added and the reaction mixture is stirred for 30 additional minutes at ambient temperature, 1 mL of acetonitrile is then added and the sample thus prepared is injected on a GC-MS device.

The quantity measured is 1.2 mg of trehalose per g of dry matter.

Step 3: Maturation of the Soft Part of the Insects

The soft part of the insects is left to rest in the collecting tank of step 2, under stirring for 1 h and at a temperature of approximately 90° C.

Step 4: Separating the Soft Part into a Solid Fraction, an Aqueous Fraction and a Fat Fraction The soft part is then separated into three fractions using a three-phase decanter. The decanter used is the Tricanter® Z23 from Flottweg.

Separation Conditions:

Flow rate: up to 500 Kg/h;

Bowl speed: 4806 rpm (3000 G);

Minimum Y: 5% (1.4 rpm).

Three fractions are obtained at the end of this separation phase: a fat fraction, a solid fraction and an aqueous fraction.

These fractions have the characteristics indicated in Table 2 below:

TABLE 2

Characteristics of the fat fraction, the solid fraction and the aqueous fraction.

| | Dry Matter (%) | Proteins (%)* | Oil (%)* | Ash (%)* | Carbohydrates (%)* |
|---|---|---|---|---|---|
| Solid fraction | 56 | 74.1 | 12.9 | 4 | 10 |
| Aqueous Fraction | 10 | 57 | 4 | 9 | 23 |
| Fat fraction | >99.5 | <0.5 | >99.5 | <0.25 | <0.25 |

*Average results calculated over several samples of each of the fractions, expressed with respect to the % of dry matter.

Determining the Size of the Soluble Proteins of the Solid Fraction and of the Aqueous Fraction Preparation of the solid sample (solid fraction): 30 mg of the sample is solubilized in 1 L of mobile phase and filtered using the Chromafil Xtra PES-45/25 filter.

Preparation of the liquid sample (aqueous fraction): 400 μL is solubilized in 1600 μL of the mobile phase and filtered using the Chromafil Xtra PES-45/25 filter, just before injection. 1.5 mL of the sample thus prepared is centrifuged for 15 min at 12000 rpm (10625 g).

The conditions for implementing the chromatography (HPLC Nexera XR from Shimadzu) are as follows: the column used is a Superdex Peptide GL 10/300 (GE Healthcare), detection is carried out by a DAD detector at 215 nm, the speed of the mobile phase is 0.3 mL/min and it is composed of ACN (acetonitrile)/$H_2O$/TFA (trifluoroacetic acid) (30/70/0.1), analysis is carried out at 25° C.

The size distribution of the soluble proteins of the solid fraction is shown in Table 3 below:

TABLE 3

The size distribution of the soluble proteins in the solid fraction

| Molecular weight (kDa) | % |
|---|---|
| >12.4 | 13.8 |
| 12.4-6.5 | 14 |
| 6.5-1.4 | 3.8 |
| 1.4-0.55 | 2.1 |
| <0.55 | 67.3 |

The size distribution of the soluble proteins of the aqueous fraction is shown in Table 4 below:

TABLE 4

The size distribution of the soluble proteins in the aqueous fraction

| Molecular weight (kDa) | % |
|---|---|
| >12.4 | 2.7 |
| 12.4-6.5 | 13.4 |
| 6.5-1.4 | 19 |
| 1.4-0.55 | 11.5 |
| <0.55 | 53.4 |

Determining the Quantity of Trehalose in the Solid Fraction and the Aqueous Fraction The quantity of trehalose in these fractions was measured in the following manner:

The trehalose is analyzed by GC-MS.

Temperature programme: 150° C., followed by an increase of 10° C./min up to 260° C., after 5 minutes at this temperature, an increase of 25° C./min up to 310° C. and maintaining this temperature for 2 minutes. Temperature of the injector: 280° C., of the interface: 250° C., the split ratio is 10, the injection volume is 1 μL.

Preparation of the sample for analysis is carried out in the following manner: a precise quantity of the sample (between 10 and 300 mg) is weighed in a Falcon tube, 9.75 mL of methanol is added thereto as well as 250 μL of an internal standard solution (myo-inositol, 25 μg/mL) in DMSO. The mixture is stirred at 80° C. for 10 minutes, 100 μL of BSTFA is then added and the reaction mixture is stirred for 30 additional minutes at ambient temperature, 1 mL of acetonitrile is then added and the sample thus prepared is injected on a GC-MS device.

The quantity measured in the solid fraction is 3.82 mg of trehalose per g of dry matter.

The quantity measured in the aqueous fraction is 33.2 mg of trehalose per g of dry matter.

In addition, the aqueous fraction comprises less than 1% by weight insoluble sediments with respect to the total weight of the aqueous fraction.

Step 5: Concentrating the Aqueous Fraction

The aqueous fraction obtained in step 4 is then concentrated by evaporation, using a falling film evaporator.

The concentrated aqueous fraction obtained has a concentration of dry matter of approximately 65%.

Step 6 (Optional): Mixing the Concentrated Aqueous Fraction and/or the Cuticles with the Solid Fraction Step 6 was not implemented in this example.

Step 7: Drying the Solid Fraction

The solid fraction obtained in step 4 is dried using a disc dryer from Haarslev for 5 h in order to obtain a dry solid fraction or a dry mixture.

From a microbiological perspective, the solid fraction comprises less than 10 UFC/g of enterobacteria.

Step 8: Grinding

The dry solid fraction is finally ground using a continuous hammer mill (6 reversible moving parts—thickness 8 mm). The grinder is fed by a hopper with a flow rate control flap (180 kg/h). The perforated grill used to control the output granulometry is 0.8 mm. The speed of rotation of the motor is 3000 rpm (electric motorization, absorbed power 4 kW (5.5 HP)).

The characteristics of an insect powder obtained are given in Table 5 below.

TABLE 5

Characteristics of an insect powder obtained in Example 1.

| Proteins | Chitin | Ash | Lipids | Carbohydrates | Trehalose |
|---|---|---|---|---|---|
| 75.1% | 1.3% | 4% | 12.5% | 10% | 0.38% |

* The percentages indicated are percentages by weight with respect to the total dry weight of the insect powder.

EXAMPLE 2: PROCESS FOR TREATING INSECTS ACCORDING TO THE INVENTION

Steps 1 to 5 were implemented as described in Example 1.

Step 6 (Optional): Mixing the Concentrated Aqueous Fraction and the Cuticles with the Solid Fraction All (100%) of the concentrated aqueous fraction obtained in step 5 as well as 0.05% by weight cuticles recovered in step 2 were mixed with all of the solid fraction obtained in step 4 in order to obtain a mixture.

A conical screw mixer from Vrieco-Nauta® was used.

Step 7: Drying the Mixture

The mixture obtained in step 6 is dried using a disc dryer from Haarslev for 5 h in order to obtain a dry mixture.

From a microbiological perspective, the dry mixture comprises less than 10 UFC/g of enterobacteria.

Step 8: Grinding

The dry mixture is finally ground using a continuous hammer mill (6 reversible moving parts—thickness 8 mm). The grinder is fed by a hopper with a flow rate control flap (180 kg/h). The perforated grill used to control the output granulometry is 0.8 mm. The speed of rotation of the motor is 3000 rpm (electric motorization, absorbed power 4 kW (5.5 HP)).

The characteristics of an insect powder obtained are given in Table 6 below.

TABLE 6

Characteristics of the insect powder obtained in Example 2.

| Proteins | Chitin | Ash | Lipids | Carbohydrates | Trehalose |
|---|---|---|---|---|---|
| 66% | 1% | 6% | 11% | 13% | 1.1% |

* The percentages indicated are percentages by weight with respect to the total dry weight of the insect powder.

The invention claimed is:

1. An insect solid fraction comprising at least 71% by weight proteins and 0.1-2% by weight chitin, said percentages by weight being expressed with respect to the total dry weight of said solid fraction, wherein at least 60% of soluble proteins of the solid fraction have a size less than 550 g/mol.

2. The insect solid fraction according to claim 1, comprising at least 73% by weight proteins.

3. The insect solid fraction according to claim 1, further comprising 5-17% by weight lipids.

4. The insect solid fraction according to claim 1, further comprising 1-10% by weight ash.

5. The insect solid fraction according to claim 1, comprising at least 73% by weight proteins and further comprising 5-17% by weight lipids and 1-10% by weight ash.

6. The insect solid fraction according to claim 1, wherein at least 65% of the soluble proteins of the solid fraction have a size less than 550 g/mol.

7. The insect solid fraction according to claim 1, comprising at least 73% by weight proteins and further comprising 5-17% by weight lipids and 1-10% by weight ash, wherein at least 65% of the soluble proteins of the solid fraction have a size less than 550 g/mol.

* * * * *